United States Patent [19]
Keller et al.

[11] Patent Number: 5,012,403
[45] Date of Patent: Apr. 30, 1991

[54] APPARATUS AND METHOD FOR REPLAYING DECODED INSTRUCTIONS

[75] Inventors: James B. Keller, Arlington; Kevin L. Ladd, West Townsend; James J. Reisert, Boxborough, all of Mass.

[73] Assignee: Digital Equipment Corporation, Maynard, Mass.

[21] Appl. No.: 176,613

[22] Filed: Apr. 1, 1988

[51] Int. Cl.⁵ .......................... G06F 9/30; G06F 9/40
[52] U.S. Cl. .................................. 364/200; 364/261.6; 364/262.9; 364/263.2; 364/265.6; 364/266.5
[58] Field of Search ................................. 364/200, 900

[56] References Cited

U.S. PATENT DOCUMENTS

| | | | |
|---|---|---|---|
| 4,385,365 | 5/1983 | Hashimoto et al. | 364/900 |
| 4,625,273 | 11/1986 | Woffinden et al. | 364/200 |
| 4,722,049 | 1/1988 | Lahti | 364/200 |

Primary Examiner—Gareth D. Shaw
Assistant Examiner—John Loomis
Attorney, Agent, or Firm—Kenyon & Kenyon

[57] ABSTRACT

An arrangement and method for decoding coded instructions and playing and replaying decoded instructions to a machine. The arrangement has a source of coded instructions. Connected to this coded instruction source is a decoder for receiving and decoding the coded instructions and for outputting the decoded instructions to a machine. A silo is connected to the output of the decoder and siloes and outputs the decoded instructions to the machine. The outputting of the decoded instructions to the machine are switched between the silo and the decoder, so that the machine receives the siloed decoded instructions. By siloing and then replaying already decoded instructions at the time of a trap occurrence, a speed increase is achieved, since the instructions which are in the trap shadow do not have to be decoded again.

9 Claims, 2 Drawing Sheets

APPARATUS AND METHOD FOR REPLAYING DECODED INSTRUCTIONS

FIELD OF THE INVENTION

The present invention relates to the field of computer hardware and the decoding of coded instructions. More specifically, this invention relates to the replaying of decoded instructions which occur during a trap shadow.

BACKGROUND OF THE INVENTION

Some modern computers use what are known as caches, which are basically small blocks of memory distributed throughout the computer which allow data to be stored and returned faster than if a large, central memory is asked for the information. An example of such a cache is an instruction stream (I-stream) cache dedicated to holding a stream of instructions for ready access. These instructions are sent to a decoder (through an instruction buffer) which decodes the I-stream, and sequentially handles processing of the specifiers and then the execution of each instruction. Specifically, the decoder parses the op-codes and operands held in the instruction buffer, thereby creating an entry point microaddress for a micro-sequencer which steps through microprograms. These entry points begin the microcode execution of operand fetch or op-code execution routines. In addition, the decoder passes other signals which it generates from the I-stream to other devices, such as increment control to a program counter, and control signals to file address logic.

In the past, computers have waited until a data stream, which is data from a data cache is verified as good before using it. This, of course, slows the machine down while the verification process is going on. A faster approach which has been taken has been to use the data just before it is verified as good, and repeat it if bad. However, an even faster approach is to use pipelining, and backing up by use of microtraps which are defined below. Basically, the data is used a relatively long time before it is verified as good data, and a trap occurs if the data turns out to be bad, as explained in more detail below.

Pipelining of instructions is used in order to speed up a machine. In non-pipelined machines, a piece of data will completely pass through a series of operations before the next piece of data begins passing through the series. In a pipelined machine, the next piece of data follows closely behind the first piece of data in entering a series of operations. In this manner, the second operation in the series will be operating on the first piece of data while the first operation in the series will be operating on the second piece of data to enter the series and so on.

Although pipelining increases the speed of a machine, a problem occurs due to microtraps. A microtrap is an event which has not occurred properly in the machine, as detected by a parity bit, for example. The microtrap is related to an instruction which was issued some time ago. When a microtrap occurs, the machine must take care of this problem. Due to pipelining, a program will continue to run after an instruction which causes a microtrap has issued. The computer then issues a trap handler address to go to some part of a program which will handle the microtrap. Because the machine has continued operating after the instruction which caused the microtrap occurrence, it may not be in a proper state at the time of the issuance of the trap handler address. Therefore, the machine is backed up to the state it was in at the time of the microtrap occurrence. Hereafter, the term "trap" will be used for the term "microtrap" for the sake of convenience.

A number of instructions have occurred during the trap shadow, which is the time between the issuance of the instruction which caused the trap and issuance of the trap handler address. After the machine has been backed up and is set going forward through the program again, the instructions which fall within the trap shadow must be replayed. Of course, it is desired that this replaying be done as quickly as possible.

SUMMARY OF THE INVENTION

It is therefore an objective of the present invention to provide a method and apparatus for replaying to a machine a decoded instruction stream as quickly as possible in the event of a trap occurrence.

This and other objectives of the present invention are provided by an arrangement for decoding coded instructions and playing and replaying decoded instructions to a machine, the arrangement comprising a source of the coded instructions, a decoder connected to the coded instruction source for receiving and decoding the coded instructions and for outputting decoded instructions to a machine, means connected to an output of the decoder for siloing and outputting the decoded instructions to the machine, and means for switching outputting of the decoded instructions to the machine between the means for siloing and the decoder.

The above-mentioned objective and other objectives of the present invention are also provided for by a method for replaying to a machine instructions decoded by a decoder which occur during a trap shadow between an instruction which causes a trap occurrence and issuance of a trap handler address, the method comprising the steps of siloing the decoded instructions for a period of time at least equal to the trap shadow, freezing further decoding of succeeding instructions by the decoder upon issuance of the trap handler address, replaying the siloed decoded instructions to the machine upon issuance of the trap handler address, and unfreezing the decoder to permit the decoder to continue the decoding of the succeeding instructions after the siloed decoded instructions have been replayed.

The method and apparatus according to the present invention provide the advantage of faithfully replaying to the machine those instructions which occurred during a trap shadow with little time loss. This is because the instructions occurring within the trap shadow have already been decoded and are waiting in the silo to be inputted to the machine when a trap occurrence has been indicated. This greatly speeds up the process of replaying the instructions to the machine, since they do not have to be decoded again.

Other objects, features and advantages of the present invention will be apparent from the accompanying drawings and from the detailed description which follows below.

BRIEF DESCRIPTION OF THE DRAWINGS

The present invention is illustrated by way of example and not limitation in the Figures of the accompanying drawings.

DETAILED DESCRIPTION

Figure 1:
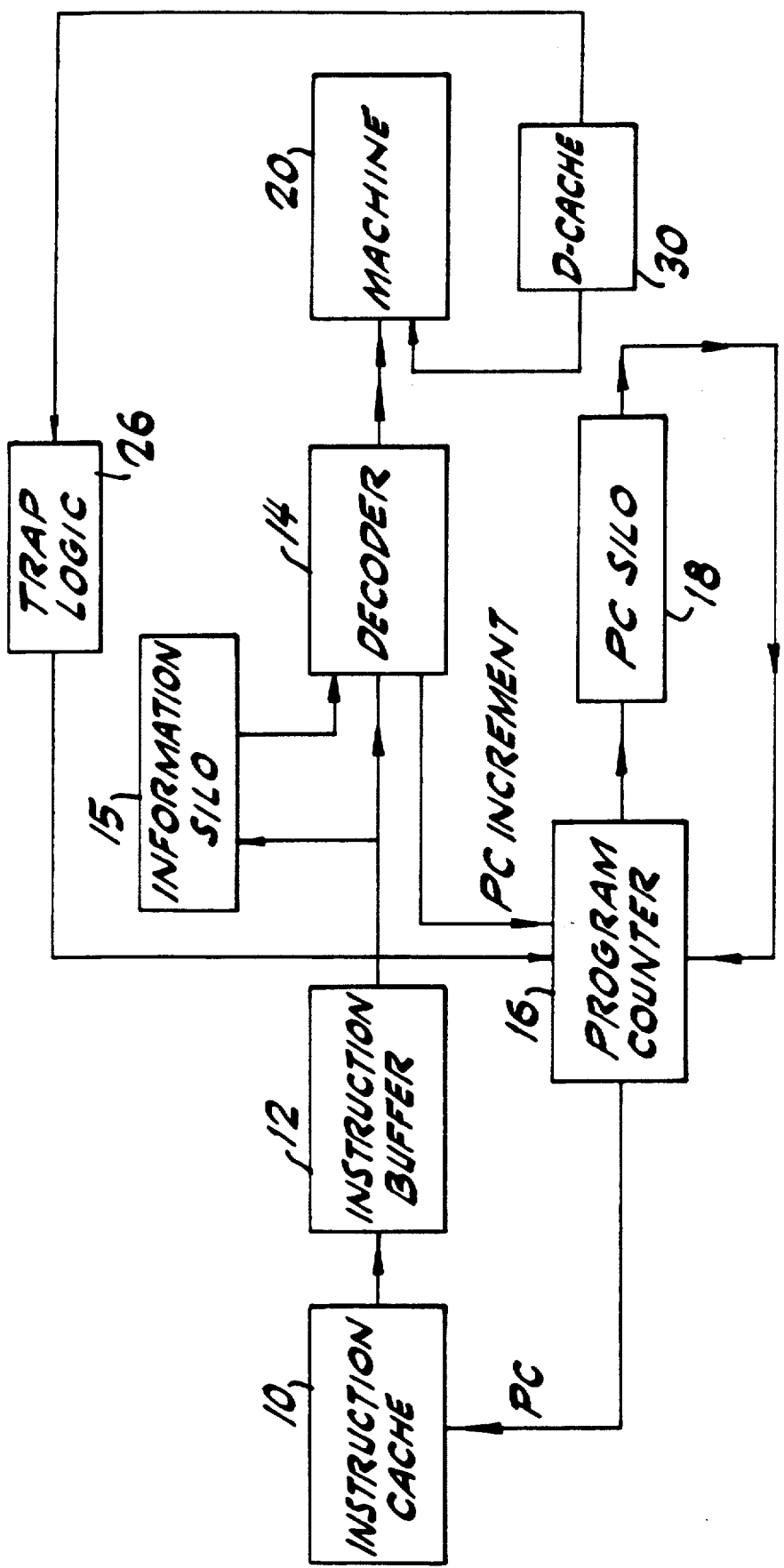
FIG. 1 is a block diagram of a prior art arrangement for decoding instructions and replaying decoded instructions to a machine.

In FIG. 1, the principal components of a prior art arrangement are shown as single blocks for reasons of clarity. The first component is an instruction store or cache (I-cache) 10 which is a memory that holds coded instructions. These coded instructions leave the I-cache 10 and enter an instruction buffer 12 that buffers the coded instructions for a decoder 14. Although in FIGS. 1 and 2 the instruction buffer 12 is shown separately from the decoder 14, in contemplated embodiments, the instruction buffer 12 can be included within the decoder 14. As mentioned earlier, the decoder 14 accepts a stream of instructions (or I-stream) from the I-cache 10 through the instruction buffer 12. The decoder 14 then parses the I-stream and generates microaddresses for the micro sequencer (not shown), updates the counter PC for the program, as will be explained in more detail, and sends op-code and control bits to other parts of a machine 20.

Connected to the decoder 14 is a program counter 16, which keeps track of which is the next instruction in the program which the I-cache 10 is to send to the instruction buffer 12. Based on the decoded information from the last received instruction, the decoder 14 sends the program counter 16 a signal indicating how to increment the counter PC, the incremented counter PC then being sent to the I-cache 10.

Connected to the machine 20 is a data cache 30 (hereinafter D-cache 30). Although the D-cache 30 is illustrated in the figures, it is to be understood that other types of devices, caches, etc., which the instructions from the I-cache 10 used can be exchanged for the D-cache 30.

Instructions are pipelined through the decoder 14 on the assumption that everything in the machine, including the instructions and the data used in the instruction, are valid. If something is amiss, as detected by trap logic 26, connected to the D-cache 30, the machine 20 will trap. Upon recognition that something invalid happened, causing the trap, the machine will issue a trap handler address or simply replay the instructions to deal with the trap. If the time between the instruction which caused the trap occurrence and the trap handler address issuance (the "trap shadow") is ten instructions long, then after the machine is backed up to its state at the trap occurrence, the ten instructions which were played during the trap shadow have to be replayed.

To replay the instructions, a program counter silo 18 is used to silo the counter PC for a length of time equal to the trap shadow. The specifier type outputs of the decoder, the decode address, the instruction buffer data and the PC increment are siloed in instruction information silo 15. Since a trap occurs sometime during an instruction, in the prior art FIG. 1, this instruction information must be saved and replayed. Thus, if a trap occurred at instruction 1, nine more instructions will have followed before the trap handler is issued, the counter PC having been incremented ten times to cause the I-cache 10 to send the proper instructions to the decoder 14. To replay these ten instructions, the counter PC corresponding to instruction 1 must then be input to the decoder 14 again so that instruction 1 is sent from the I-cache 10. Since instruction 1, and the succeeding instructions, contain the information on how to increment the counter PC, the same sequence of coded instructions 1-10 will be replayed from the I-cache 10. These coded instructions must then pass through the instruction buffer 12 and be decoded again by decoder 14.

This process of siloing the counter PC and restarting the I-cache 10 at the counter PC corresponding to the instruction that happened at the trap occurrence, adequately replays the instructions occurring during a trap shadow. However, it suffers from slowness since the instructions from the I-cache 10 have to be looked up and decoded again. To overcome this deficiency, the present invention shown in FIG. 2 no longer siloes the opcode, specifier numbers, specifier type outputs of the decoder, decode address, instruction buffer data and the PC increment. Instead, decoded instructions are siloed for the trap shadow time.

Figure 2:
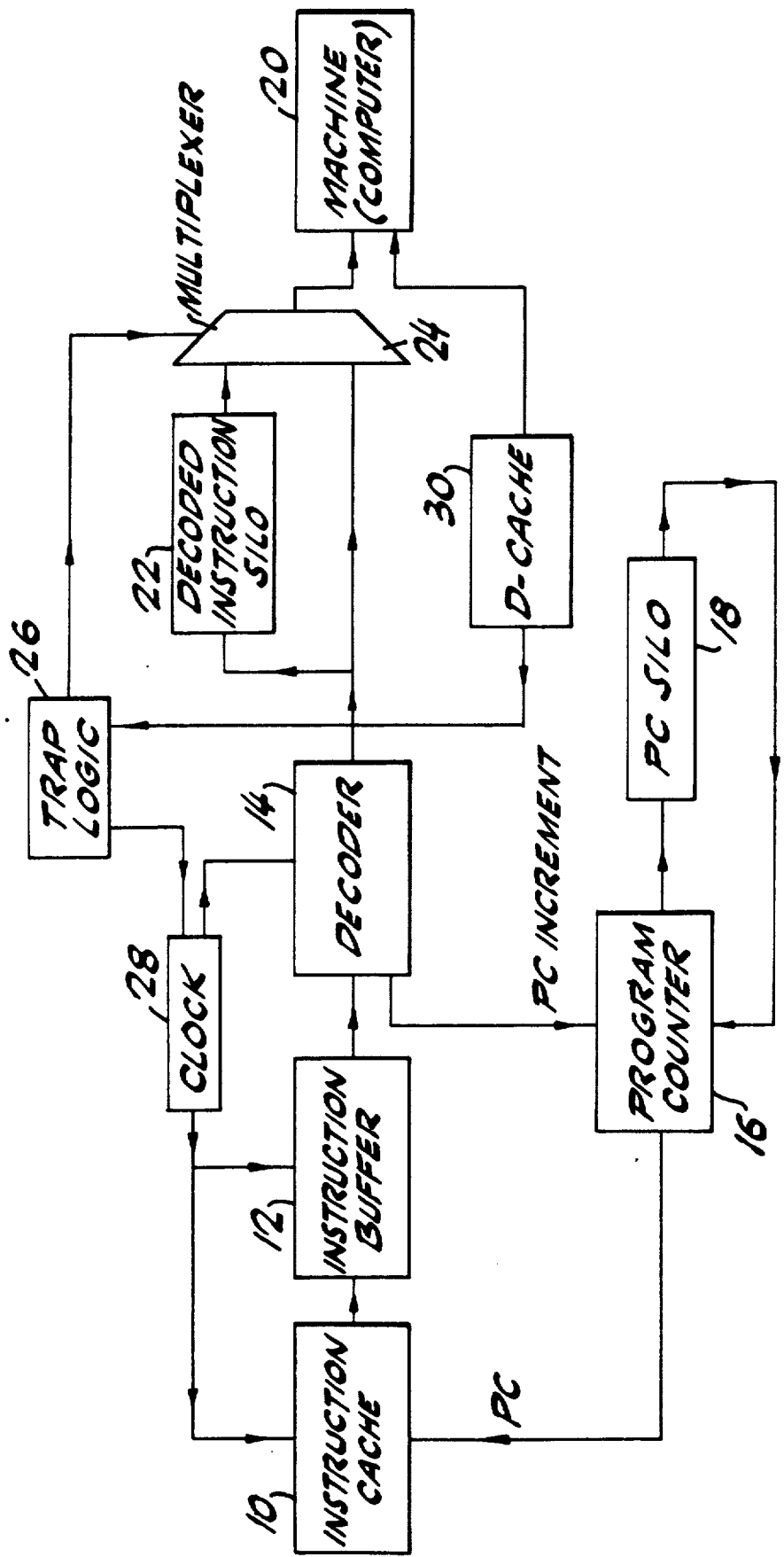
FIG. 2 is a block diagram of an arrangement for decoding instructions and replaying those decoded instructions to a machine in accordance with the present invention.

A comparison of the arrangement of FIG. 2 with that of FIG. 1 shows that a decoded instruction silo 22 is used instead of the instruction information silo 15. Already decoded instructions are sent along two paths, the first being a direct path to the machine 20, and the second being a path through the decoded instruction silo 22.

The inputs of a multiplexer 24 are connected to the outputs of the decoder 14 and the decoded instruction silo 22. The multiplexer 24 selects which output to pass on through to the machine 20, based on a multiplexer control signal received from the trap logic 26. A clock 28 is shown as attached to the I-cache 10, the instruction buffer 12 and the decoder 14, and can be frozen or held by hold control signals from the trap logic 26.

During normal operation, instructions are clocked through the system. As the decoder 14 decodes the instructions from the I-cache 10 and the instruction buffer 12, they are sent through multiplexer 24 to the machine 20. These decoded instructions are also being siloed in decoded instruction silo 22. Since no trap handler address has yet been issued, the control signal from the trap logic 26 to multiplexer 24 causes the multiplexer 24 to pass the decoder output to machine.

In the following example of the operation of the system during a trap occurrence, we will assume that the trap shadow is ten instructions long, so that the decoded instruction silo 22 is configured to silo the last ten instructions outputted from the decoder 14. Also, for an instruction stream of instructions 1-30, we will assure that a trap occurs during instruction 6. Therefore, when a trap handler address is issued at instruction 15, instructions 1-15 have passed through the multiplexer 24 to the machine. During this same time period, instructions 1-5 have passed completely through the decoded instruction silo 22, which now contains decoded instructions 6-15.

Although instructions 6-15 have already been sent to the machine 20, they were sent during the trap shadow, and when the machine is backed up to its state at the trap occurrence, these instructions 6-15 have to be sent to the machine again. At the issuance of the trap handler address, the trap logic 26 does two things. First, it freezes the clock 28. This holds the decoder 14, the instruction buffer 12, and the I-cache 10 in their state of decoding instructions 16-30. Second, the trap logic 26 sends a multiplexer control signal to cause multiplexer 24 to pass through the output of the decoded instruction silo 22 to the machine 20. This empties the silo 22 and correctly replays the already decoded instructions 6–15 which fell within the trap shadow.

After a period of time equal to the trap shadow has passed, the trap logic 26 unfreezes the clock 28 and the decoder 14 then proceeds decoding instructions 16–30 as if no trap had occurred. The trap logic 26 causes the multiplexer 24 to again pass through the output of the decoder 14 to the machine 20, so that instructions 16–30 will go to the machine 20, as well as to the decoded instruction silo 22. Thus, instructions 6–15 have been replayed from the decoded instruction silo 22, and the succeeding instructions 16–30 have followed as if no trap had occurred.

From the above example of the operation of the arrangement of FIG. 2, it should be evident that an increase in speed is achieved by siloing and replaying already decoded instructions, rather than restarting and re-decoding those instructions which fell within the trap shadow.

In the foregoing specification, the invention has been described with reference to a specific exemplary embodiment thereof. It will, however, be evident that various modifications and changes may be made thereto without departing from the spirit and scope of the invention as set forth in the appended claims. The specification and drawings are, accordingly, to be regarded in an illustrative rather than a restrictive sense.

What is claimed is:

1. A method of replaying instructions to a computer said instructions being decoded by a decoder, and said instructions occurring during a trap shadow, which is a time between an instruction which has caused a trap occurrence and issuance of a trap handler address, the method comprising the steps of:
   siloing the decoded instructions in the sequence that they are output by the decoder, for a period of time at least equal to said trap shadow;
   issuing a trap handler address;
   freezing further decoding of succeeding instructions by the decoder upon issuance of the trap handler address;
   replaying said siloed decoded instructions to the computer upon issuance of the trap handler address; and
   unfreezing the decoder to permit the decoder to continue decoding of the succeeding instructions after the siloed decoded instructions have been replayed.

2. The method of claim 1, further comprising the step of selecting to be output to the computer:
   the siloed decoded instructions upon issuance of the trap handler address; and
   the succeeding instructions after unfreezing of the decoder and decoding of the succeeding instructions.

3. The method of claim 2, wherein the step of freezing the decoder includes freezing a clock to the said decoder.

4. An apparatus for decoding coded instructions and playing and replaying decoded instructions to a computer, the arrangement comprising:
   a source of at least one coded instruction;
   means for issuing a trap handler address;
   a decoder coupled to said coded instruction source for receiving and decoding the coded instructions and for outputting the decoded instructions to the computer;
   means for continuously siloing the decoded instructions coupled to an output of said decoder, said means arranged to output the decoded instructions to the computer; and
   means for switching between said means for siloing and said decoder the outputting of the decoded instructions to the computer,
   said means for switching to output the decoded instructions from said decoder to the computer prior to the issuance of a trap handler address, and to output the siloed decoded instructions from said means for continuously siloing upon the issuance of a trap handler address by said means for issuing a trap handler address.

5. An apparatus according to claim 4, wherein said means for switching includes a multiplexer with first and second inputs coupled to respective outputs of said decoder and said means for siloing, and an output coupled to the computer, said multiplexer being responsive to multiplexer control signals indicating a trap in the computer has occurred so as to select outputting to the computer the decoded instructions in said means for siloing, and to select outputting to the computer the decoded instructions from said decoder when the multiplexer control signals do not indicated occurrence of a trap.

6. An apparatus according to claim 5, further comprising means for holding said decoder and said coded instruction source from decoding instructions until said means for siloing has completed outputting said siloed decoded instructions to the computer, in response to multiplexer control signals indicating a trap in the computer has occurred.

7. The apparatus of claim 6, wherein said means for siloing is a series of stage registers which holds each said decoded instruction for a period of time equal to the trap shadow.

8. The arrangement of claim 7, wherein said means for holding includes means for temporarily stopping clocks in said decoder and said coded instruction source.

9. The arrangement of claim 8, further comprising means for generating said multiplexer control signals and said hold control signals in response to recognition of said trap occurrence.

* * * * *